United States Patent [19]
Capici et al.

[11] Patent Number: 6,060,875
[45] Date of Patent: May 9, 2000

[54] ELECTRONIC DEVICE FOR SMOOTHING A CHARGE CURRENT PEAK IN RLC OUTPUT STAGES OF SWITCHING STEP-UP REGULATORS

[75] Inventors: Salvatore Capici, Barrafranca; Angelo D'Arrigo, Catania; Filippo Marino, Palermo; Francesco Pulvirenti, Acireale; Antonio Magazzu, Messina, all of Italy

[73] Assignee: STMicroelectronics S.r.l., Agrate Brianza, Italy

[21] Appl. No.: 09/248,924

[22] Filed: Feb. 11, 1999

[30] Foreign Application Priority Data

Feb. 17, 1998 [IT] Italy .................. MI98A0290

[51] Int. Cl.[7] ........................................ H02J 1/00
[52] U.S. Cl. ............................................ 323/354
[58] Field of Search ........................... 323/220, 222, 323/266, 273, 352, 353, 354

[56] References Cited

U.S. PATENT DOCUMENTS

| 4,229,681 | 10/1980 | Plumb | 315/244 |
|---|---|---|---|
| 4,734,601 | 3/1988 | Lewus | 310/68 E |
| 4,736,286 | 4/1988 | Gulczynski | 363/70 |
| 5,852,385 | 12/1998 | Izumikawa | 331/57 |
| 5,894,174 | 4/1999 | Kiiskinen | 307/105 |

*Primary Examiner*—Matthew Nguyen
*Attorney, Agent, or Firm*—Theodore E. Galanthay; Robert Iannucci; Seed IP Law Group PLLC

[57] ABSTRACT

An electronic device smoothes a charge current peak in RLC output stages of switching step-up regulators, which stages include an input terminal and an output terminal with an inductance and a parasitic resistance in series therebetween, the latter corresponding to the series parasitic resistance of the inductance, and a capacitor connected between the output terminal and a ground. The device comprises a parallel of a resistor and a controlled switch connected between the inductance and the output terminal of the stage upstream of the capacitor. Advantageously, the switch would only be open during the charge transient of the capacitor.

20 Claims, 6 Drawing Sheets

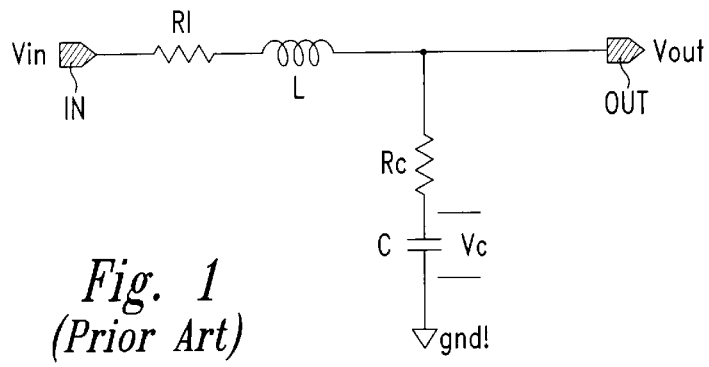
Fig. 1
*(Prior Art)*
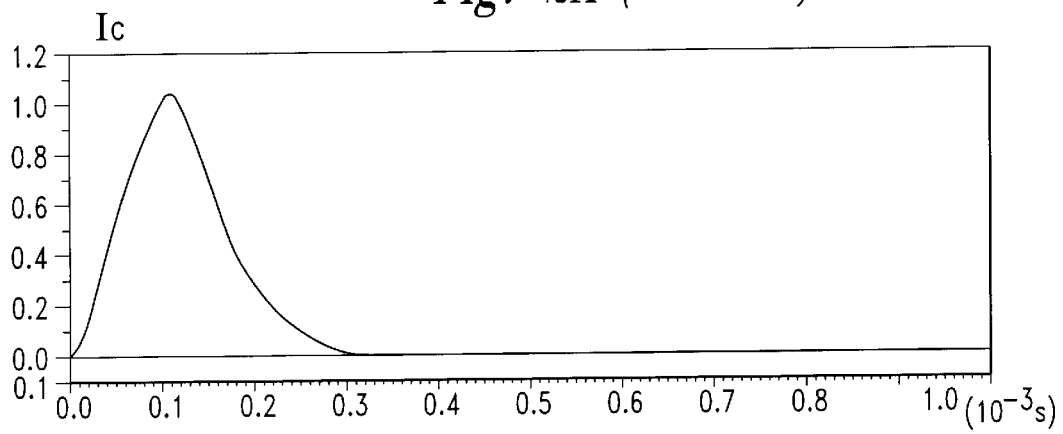
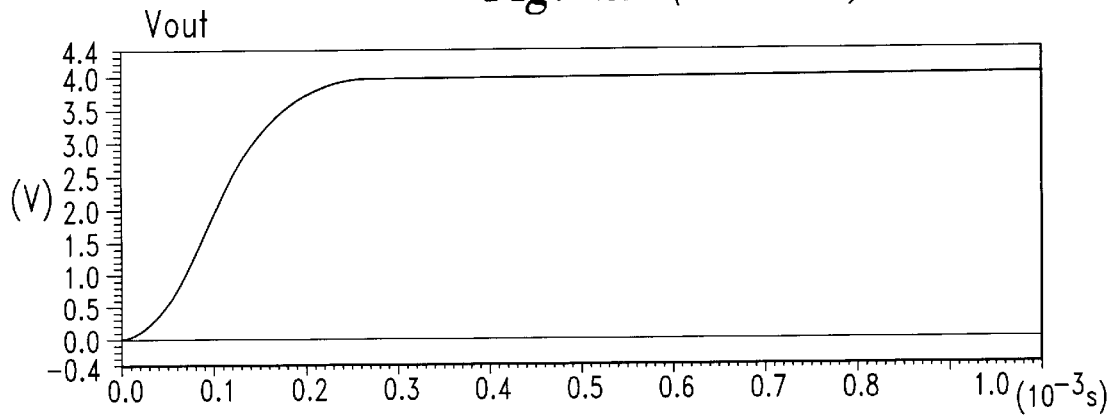

ELECTRONIC DEVICE FOR SMOOTHING A CHARGE CURRENT PEAK IN RLC OUTPUT STAGES OF SWITCHING STEP-UP REGULATORS

FIELD OF THE INVENTION

This invention relates to an electronic device for smoothing a charge current peak in RLC output stages of switching step-up regulators.

More particularly, the invention relates to an electronic device as above, intended for an output stage which includes an input terminal and an output terminal with an inductance and a parasitic resistance in series therebetween, the latter corresponding to the series parasitic resistance of the inductance, and a capacitor connected between the output terminal and a ground.

BACKGROUND OF THE INVENTION

As is well known to those skilled in the art, switching regulation circuits, specifically step-up ones, have applications in many communications apparatuses, such as cellular telephones, and similar battery-operated portable devices.

Such regulators comprise a final output stage which is ideally equipped with an LC filter, this term implying the provision of an Inductor-Capacitor circuit. However, due to the presence of parasitic resistances, the LC filter is practically bound to be an RLC filter, i.e., a Resistor-Inductor-Capacitor type of filter.

FIG. 1 of the accompanying drawings shows schematically a final output stage of a prior art regulator.

This output stage incorporates an RLC filter and has input IN and output OUT terminals with a parasitic resistance Rl and an inductance L in series therebetween.

Connected between the output terminal OUT and a ground GND is a capacitor C having a parasitic resistance Rc in series therewith.

More particularly, the resistance Rl represents the parasitic series resistance of the inductance L, while the resistance Rc represents the parasitic series resistance of the capacitor C.

The RLC circuit of FIG. 1 can be defined by the following equation:

$$\frac{d2}{dt}vc + \frac{(Rl+Rc)}{L}\frac{d}{dt}(vc) + \frac{1}{LC}vc = \frac{Vin}{LC}$$

where, Vin is a supply voltage applied to the input terminal IN of the output stage.

Assuming a supply voltage Vin with a waveform ramp from 0V to 4V through a 100 µs time period, for example, the current transient at the RLC filter will be the waveform shown in FIG. 2A. Also, FIG. 2B shows the voltage trend across the capacitor C and parisitic resitance Rc (Vout), corresponding to the capacitor C being charged according to the transient of FIG. 2A.

Since the capacitor C is initially in a discharged condition, i.e., the voltage drop Vc across it is 0V, the current on the RLC filter will be only limited by the inductance and the parasitic resistances, with a damping value ξ being given by the following relationship:

$$\xi = \frac{1}{2}\sqrt{\frac{C}{L}}(Rl+Rc)$$

In essence, there occurs a pronounced current pulse which subsides as soon as the capacitor C begins to be charged. This is indeed a current peak which can harm the inductor.

To prevent possible damage, more expensive inductors, capable of withstanding high current peaks, must be used.

SUMMARY OF THE INVENTION

An embodiment of this invention is to provide an electronic device for association with the final output stage of switching regulators, which has such functional and constructional features as to smooth the charge current peak on the RLC filter at the regulator output. This would allow RLC filters to be used with quite inexpensive inductors, thereby overcoming the drawbacks with which the solutions proposed by the prior art are still beset. The device operates by smoothing the current peak which is generated during the step-up transient.

The device previously indicated includes a parallel of a resistor and a controlled switch connected between the inductance and the output terminal of the stage, upstream of the capacitor.

The features and advantages of a device according to the invention will be apparent from the following description of an embodiment thereof, given by way of non-limitative example with reference to the accompanying drawings.

BRIEF DESCRIPTION OF THE DRAWINGS

FIG. 1 is a diagramatic view of a final output stage for switching regulators, constructed according to the prior art and incorporating an RLC circuit.

FIGS. 2A and 2B show schematically plots of waveforms versus time for current and voltage signals which appear in the stage of FIG. 1.

DETAILED DESCRIPTION

Figure 3:
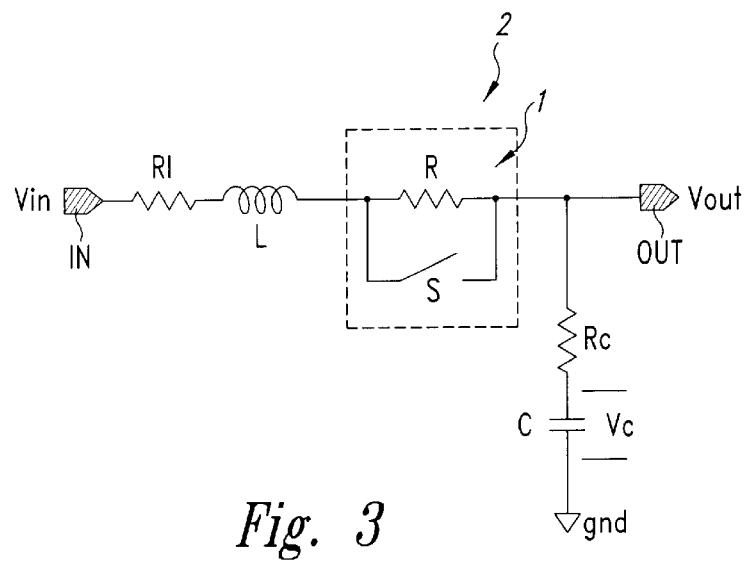
FIG. 3 is a diagramatic view of an electronic device according to this invention.

With reference to the drawing figures, specifically to the example of FIG. 3, shown generally and schematically at 1 is an electronic device according to an embodiment of this invention and intended for smoothing a charge current peak on an output filter 2 of switching step-up regulators.

Like the output filter shown in FIG. 1, the output filter 2 incorporates an RLC filter, and has an input terminal IN and an output terminal OUT with a parasitic resistance Rl and an inductance L in series therebetween.

Connected between the output terminal OUT and a ground GND is a capacitor C which has a parasitic resistance Rc in series therewith.

Advantageously in this invention, the device 1 is connected between the inductor L and the output terminal OUT of the output filter 2, but upstream of the capacitor C.

The device 1 comprises a parallel of a resistor R and a controlled switch S. The switch S is open during the charge transient of the capacitor C. At the end of this transient, the switch S will be controlled to close and thereby short-circuit the resistor R.

Thus, during the charge transient, the resistor R adds to the resistive effects of the inductor and the capacitor, thereby reducing the amplitude of the current peak on the RLC filter.

There results a substantial increase in the damping value ζ, as brought out by the following formula:

$$\xi = \frac{1}{2}\sqrt{\frac{C}{L}(Rl + Rc + R)}$$

With specific reference to the example of FIG. 4, a preferred embodiment of the device 1 circuit will now be described in further detail.

The switch S, connected in parallel to the resistor R, is implemented with a pair of MOS transistors M1, M2.

The transistor M2 is a PMOS transistor having respective source and drain conducting terminals which are connected to the opposed ends of the resistor R, respectively. The transistor M2 has a control terminal G2 connected toward ground GND through a series of the transistor M1 and a current generator A1.

The control terminal G2 is also connected to one end of the resistor R through a Zener diode DZ. In particular, the diode DZ is provided on the side of the resistor R that is connected to the inductor L.

The transistor M1 is an NMOS transistor having respective source and drain conducting terminals connected to the current generator A1 and the control terminal G2 of the transistor M2.

The transistor M1 has a control terminal G1 to receive an enable signal EN.

A diode D may be provided between the device 1 and the inductor L. The diode D is a free wheeling diode of the step-up regulator and contributes a voltage drop that can be neglected for this description.

The device 1 further comprises a current mirror 4 connected in parallel with the diode DZ, specifically on the side of the resistor R connected to the inductor L.

The current mirror 4 comprises first M3 and second M4 mirror transistors, of the PMOS type in the example shown.

The second mirror transistor M4 has respective source and drain conducting terminals connected across the diode DZ, and has a control terminal connected to the control terminal of the first mirror transistor M3, in a diode configuration with its source terminal connected toward ground GND through a series of an additional transistor M5 and a current generator A2.

The transistor M5 is an NMOS transistor having respective source and drain conducting terminals connected to the current generator A2 and the source terminal of the first mirror transistor M3.

The transistor M5 also has a control terminal G5 connected to the input terminal IN of the stage 2.

Figure 4:
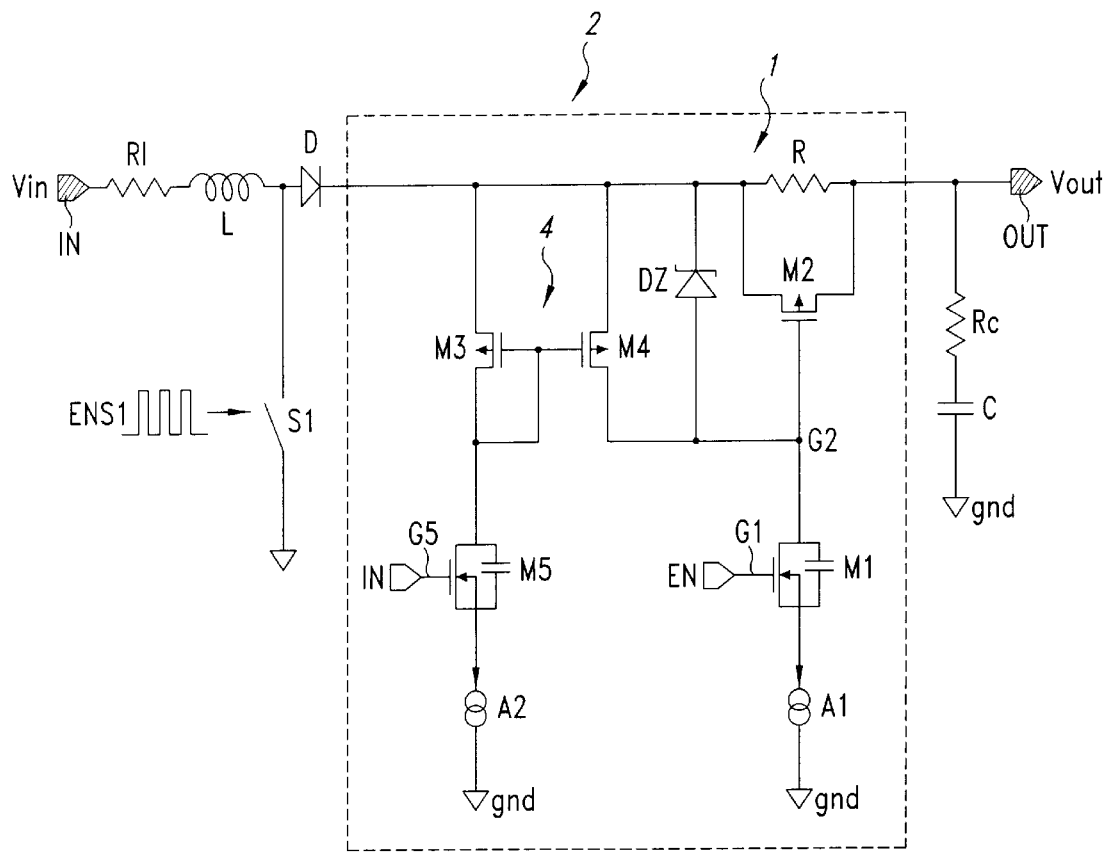
FIG. 4 is a diagramatic view showing the circuit of the device of FIG. 3 in greater detail.

FIG. 4 also shows a switch S1 connected between one terminal of the inductor L and ground and controlled by a signal ENS1. The switch S1 symbolizes a switch of the step-up switching regulator of which the output filter 2 is a part.

The operation of the inventive device 1 will now be described.

Upon application of the supply voltage Vin to the input terminal IN of the stage 2, the enable signal EN has a zero value and the switch S1 and the transistor M1 are controlled to open.

In this condition, the step-up regulator is still in the off state and the transistor M1 is non-conducting.

The gate-source voltage drop Vgs of the PMOS transistor M2 will be below the conduction threshold of the transistor, and accordingly, the transistor will open to admit the charge to the capacitor C through the inductor L and the resistors R and Rc.

The current mirror 4 comprising the transistors M3 and M4 ensures that the transistor M2 is turned off. In fact, without this mirror 4, with the transistor M1 in the off state, the node G2 would rise to an indefinite voltage which may cause the transistor M2 to be turned on, if the parasitic currents, mainly tied to the technological process for fabricating the device, happen to be substantial.

Advantageously in this invention, the current mirror 4 forces a small current (less than 1 μA) on the node G2, thereby holding the transistor M2 off while the transistor M1 is off.

The charge current flows serially through the resistors Rl, R and Rc.

Figure 5A:
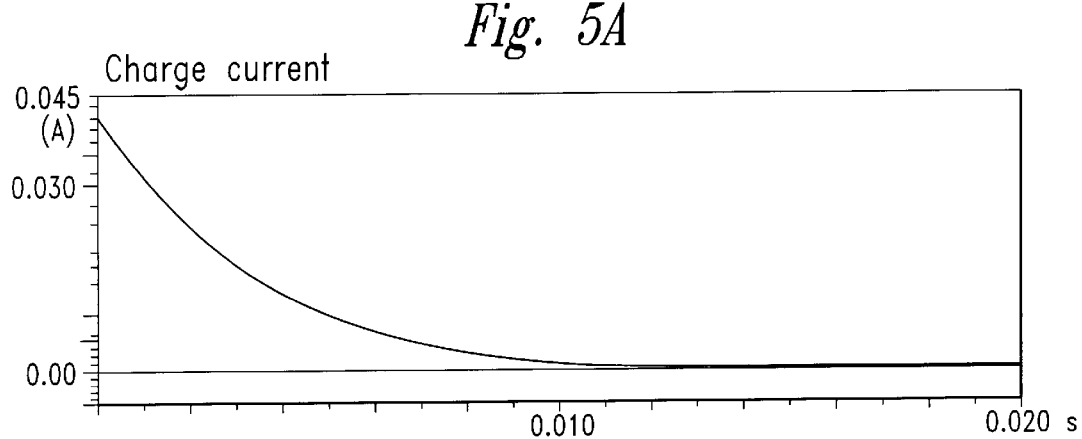
FIGS. 5A and 5B show schematically plots of waveforms versus time for current and voltage signals which appear in a final output stage of switching regulators equipped with the device shown in FIGS. 3 and 4.
Figure 5B:
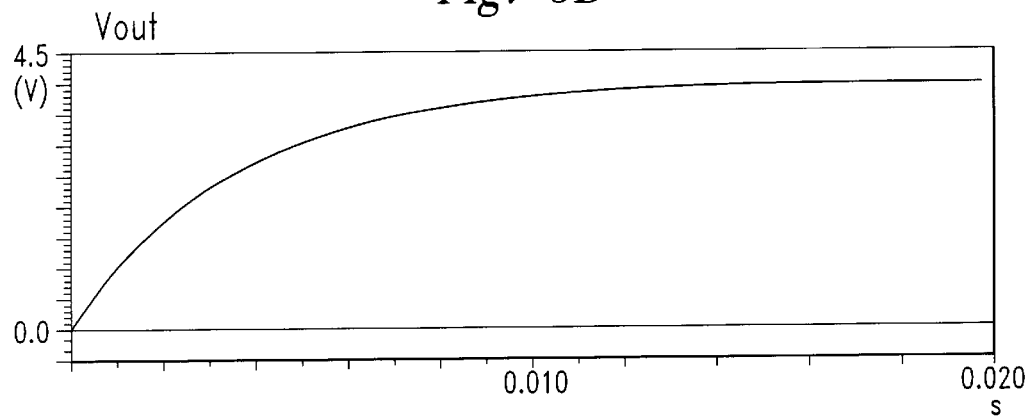

The charge current transient shown in FIG. 5A brings out that the current peak is much reduced and shifted toward the initial time of the transient phase.

The enable signal EN will activate the step-up regulator upon the charge transient of the capacitor C subsiding. On receiving the signal EN, the transistor M1 will close and force the other transistor M2 to conduct, short-circuiting the resistor R. All this because the current flowing through the transistor M1 is larger than the current flowing through the second mirror transistor M4.

It should be noted that the device of this invention would not affect the steady-state performance of the step-up regulator.

The Zener diode DZ is arranged to ensure, for the PMOS transistor M2, a voltage drop Vgs of no more than 5 V in the presence of high values of the output voltage Vout.

Only a few microamperes will be flowing through the Zener diode DZ, compared to the hundreds of mA that flow through the inductor L.

It should be noted that, since the transistors M1 and M5 are components capable of withstanding high voltage drops, the structure which includes the low-voltage components, i.e., the mirror transistors M3 and M4, as well as the transistor M2, diode DZ and resistor R, can now operate at high voltage values. Thus, the device 1 of this invention has an advantage in that it includes low-voltage components, which are more reliable from the standpoint of their fabrication technology and operation, and can be used in connection with high voltage values.

Figure 6:
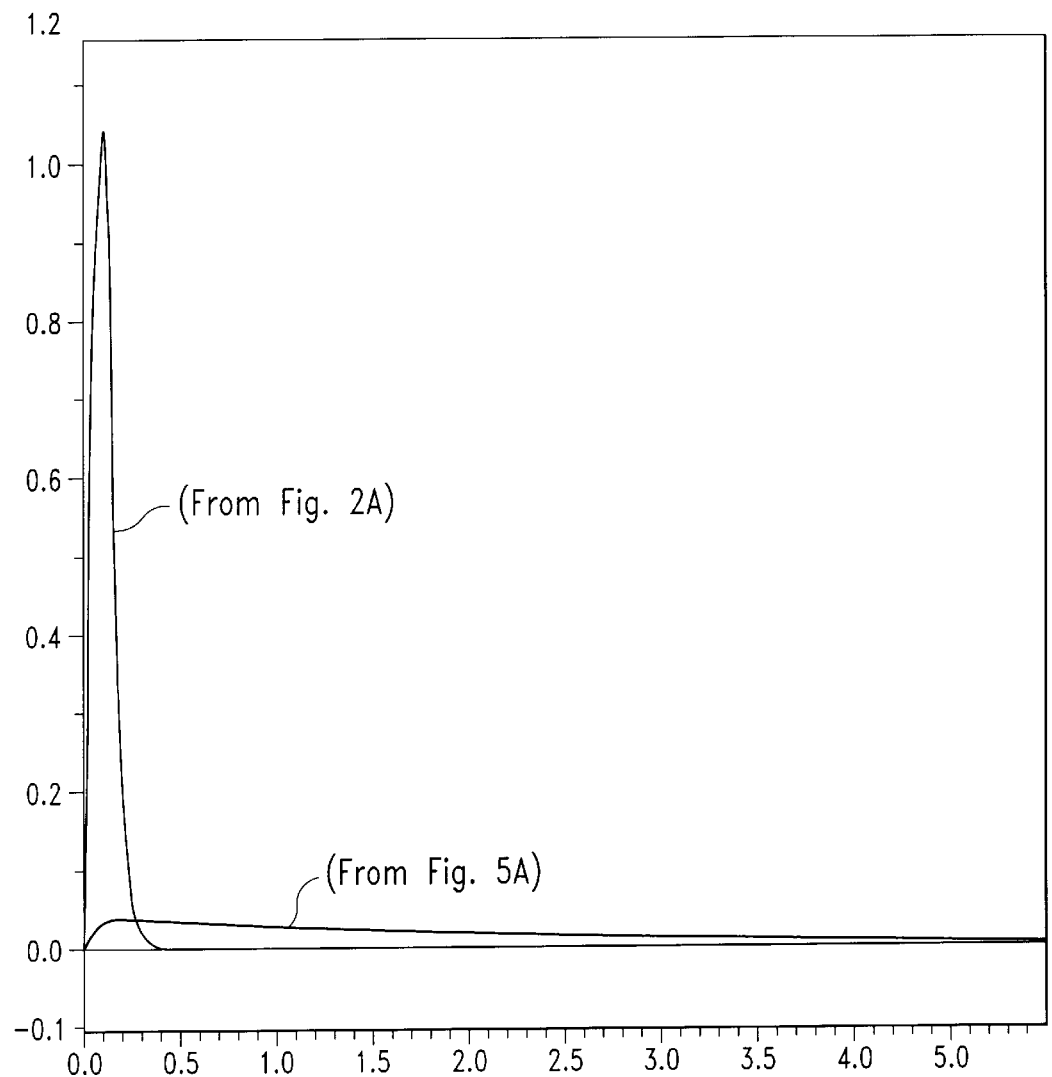
FIG. 6 is a comparative current (A)/time (ns) graph of the current peaks present in the designs of FIGS. 1 and 3, respectively.

FIG. 6 is a plot comparing the prior art design with this invention. FIG. 6 results essentially from an enlarged scale superposition of FIGS. 2A and 5A.

Figure 7:
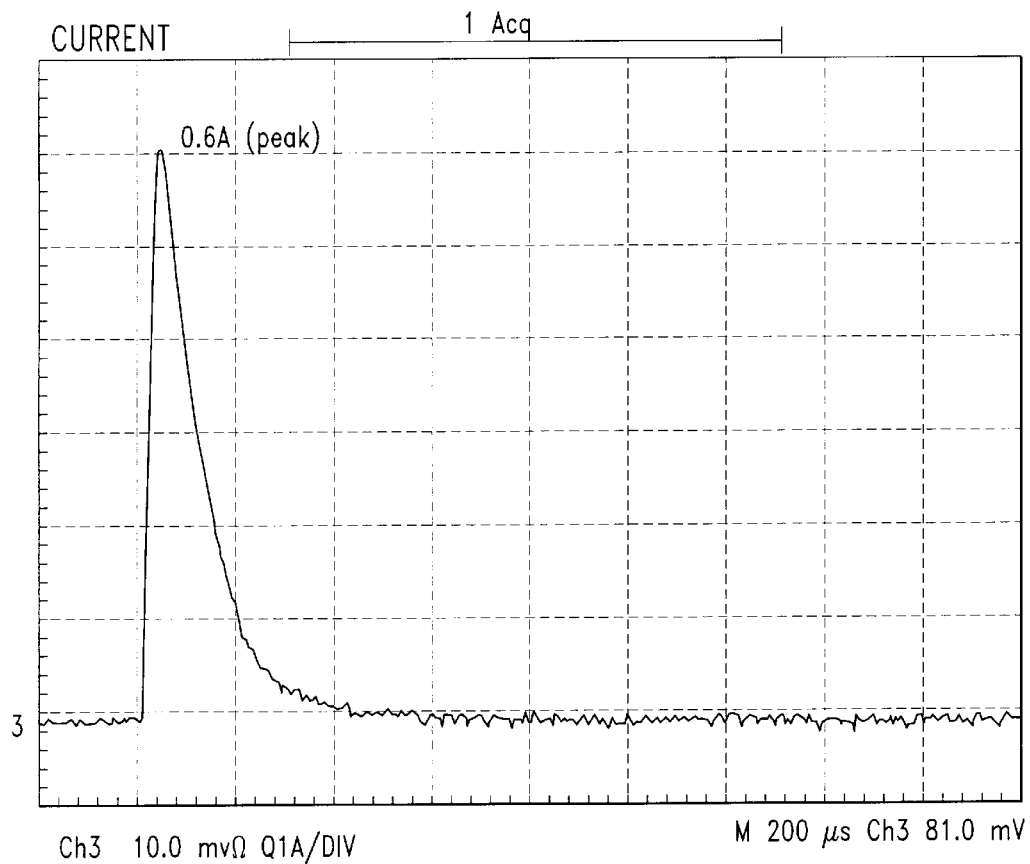
FIGS. 7 and 8 show schematically current vs. voltage curves obtained from experimental tests carried out on the circuit design of FIG. 1 and the design shown in FIG. 3, respectively.
Figure 8:
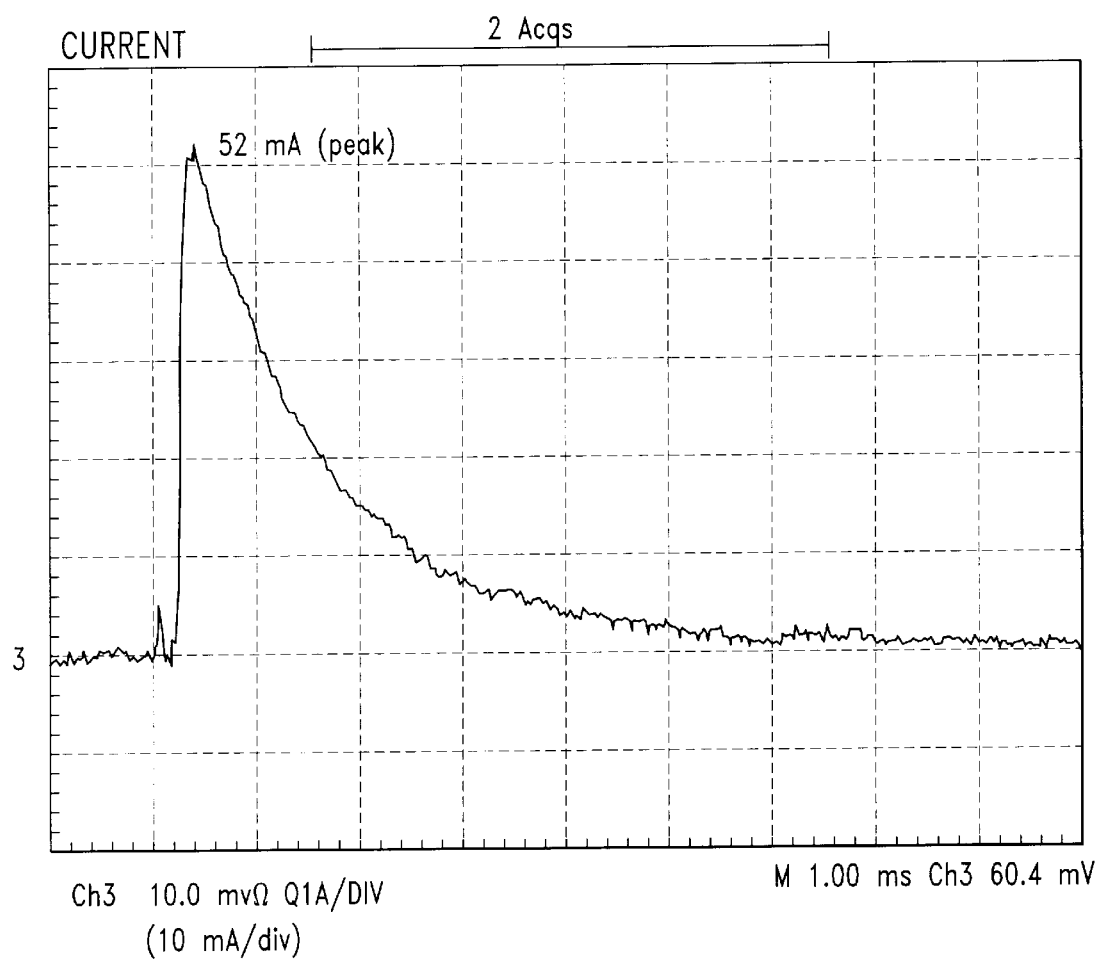

FIGS. 7 and 8 show schematically respective current vs. time curves obtained from actual tests carried out on the prior art circuit and the design shown in FIG. 4, respectively.

To summarize, the device shown in FIG. 4 does solve the technical problems of the prior art design, and greatly reduces the charge current peak on the RLC filter of the final output stage of a step-up switching regulator upon its connection to the power supply being established.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. An electronic device for smoothing a charge current peak in an RLC output stage of a switching step-up regulator, said stage including an input terminal and an output terminal with an inductance and a parasitic resistance in series therebetween, the the parasitic resistance corresponding to a series parasitic resistance of the inductance, and a capacitor connected between the output terminal and a ground, the electronic device comprising a parallel of a resistor and a controlled switch connected between the inductance and the output terminal of the stage upstream of the capacitor.

2. A device according to claim 1, wherein the said controlled switch is only open during a charge transient of the capacitor.

3. A device according to claim 1, wherein said controlled switch comprises first and second MOS transistors.

4. A device according to claim 3, wherein said second MOS transistor has conducting terminals respectively connected to opposed ends of the resistor.

5. A device according to claim 4, wherein said first MOS transistor has conducting terminals connected between a control terminal of the first transistor and a current generator connected to ground.

6. A device according to claim 4, wherein said first transistor has a control terminal that receives an enable signal upon the regulator being activated.

7. A device according to claim 4, wherein said second transistor is a PMOS transistor.

8. A device according to claim 4, wherein said first transistor is an NMOS transistor.

9. A device according to claim 5, further comprising a Zener diode connected between the control terminal of the first transistor and one end of said resistor.

10. A device according to claim 5, further comprising a current mirror connected between the control terminal of the first transistor and one end of said resistor.

11. A device according to claim 10, wherein said current mirror comprises first and second mirror transistors, said second mirror transistor having respective conducting terminals connected between the control terminal of the first transistor and one end of said resistor, and having a control terminal connected to a control terminal of said first mirror transistor in a diode configuration.

12. A device according to claim 11, wherein said first mirror transistor has a terminal connected to ground through a series of an additional transistor and a current generator, said additional transistor having respective conducting terminals connected to the current generator and a conducting terminal of the first mirror transistor.

13. A device according to claim 12, wherein said additional transistor is an NMOS transistor.

14. An electronic circuit for a regulator, comprising:
input and output nodes;
an inductor connected between the input and output nodes;
a capacitor connected between the output node and a voltage reference; and
a parallel circuit connected between the inductor and the output node, the parallel circuit including a resistance and a first controlled switch having first and second conductive terminals respectively connected to first and second ends of the resistance.

15. The electronic circuit of claim 14, further comprising:
a zener diode connected between the first conductive terminal and a control terminal of the first controlled switch.

16. The electronic circuit of claim 14, further comprising:
a second controlled switch having a first conductive terminal coupled to a control terminal of the first controlled switch, a second conductive terminal coupled to the voltage reference, and a control terminal coupled to an enable signal.

17. The electronic circuit of claim 14, further comprising:
a current mirror connected between the control and the first conductive terminals of the first controlled switch, the current mirror including:
a first mirror transistor having first and second conductive terminals and a control terminal, the first conductive terminal of the first mirror transistor being connected to the first conductive terminal of the first controlled switch; and
a second mirror transistor having first and second conductive terminals and a control terminal, the first and second conductive terminals of the second mirror transistor being respectively connected between the first conductive and control terminals of the first controlled switch, and the control terminals of the first and second mirror transistors being connected to each other and to the second conductive terminal of the first mirror transistor.

18. The electronic circuit of claim 14, further comprising a second controlled switch and a current source coupled between the second terminal of the first mirror transistor and the voltage reference.

19. A method of controlling an LC circuit having an inductor connected between an input node and an output node and a capacitor connected between the output node and a voltage reference, the method comprising:
providing a resistor between the inductor and the output node during a transient portion of a charging phase during which the capacitor is charged; and
shorting the resistor after the transient portion of the charging phase.

20. The method of claim 19 wherein the providing step includes keeping open a controlled switch during the transient portion, the controlled switch being in parallel with the resistor, and the shorting step includes closing the controlled switch.

* * * * *